(12) United States Patent
Tohono

(10) Patent No.: US 7,162,239 B2
(45) Date of Patent: Jan. 9, 2007

(54) CELLULAR TELEPHONE EQUIPMENT AND CELL SEARCH METHOD USED THEREFOR

(75) Inventor: Kousuke Tohono, Tokyo (JP)

(73) Assignee: NEC Corporation, Tokyo (JP)

( * ) Notice: Subject to any disclaimer, the term of this patent is extended or adjusted under 35 U.S.C. 154(b) by 367 days.

(21) Appl. No.: 10/219,564

(22) Filed: Aug. 15, 2002

(65) Prior Publication Data

US 2003/0040312 A1 Feb. 27, 2003

(30) Foreign Application Priority Data

Aug. 22, 2001 (JP) ............................. 2001-250957

(51) Int. Cl.
*H04Q 7/20* (2006.01)
(52) U.S. Cl. ...................... 455/434; 455/436; 455/458; 455/67.11; 455/226.1
(58) Field of Classification Search ............ 455/435.1, 455/435.2, 458, 515
See application file for complete search history.

(56) References Cited

U.S. PATENT DOCUMENTS

| 5,574,996 | A  | * | 11/1996 | Raith ....................... 455/161.3 |
| 6,205,334 | B1 | * | 3/2001  | Dent .......................... 455/434 |
| 6,292,660 | B1 | * | 9/2001  | Hartless et al. .............. 455/434 |
| 6,526,286 | B1 | * | 2/2003  | Wan ........................... 455/515 |

FOREIGN PATENT DOCUMENTS

| CN | 1283014 A    | 2/2001  |
| EP | 0903951 A2   | 3/1999  |
| EP | 1061752 A1   | 12/2000 |
| EP | 1069794 A2   | 1/2001  |
| EP | 1085776 A2   | 3/2001  |
| JP | 10-84572     | 3/1998  |
| JP | 11-113044    | 4/1999  |
| JP | 2000-354266  | 12/2000 |
| JP | 2001-28778   | 1/2001  |
| JP | 2001-86035   | 3/2001  |
| JP | 2001-86560   | 3/2001  |
| JP | 2001-112046  | 4/2001  |

* cited by examiner

*Primary Examiner*—Temica Beamer
(74) *Attorney, Agent, or Firm*—Scully, Scott, Murphy & Presser, P.C.

(57) ABSTRACT

This invention discloses a cellular telephone equipment which performs cell search of detecting a connection cell upon reception of a paging channel transmitted from a base station in order to broadcast an incoming signal, comprising a unit which controls to search each of a plurality of cells to be searched at a reception timing of the paging channel at different frequencies, and a cell search method used for the cellular telephone equipment. A plurality of cells to be searched are classified into three types: a first cell which is receiving the paging channel, a second cell as a hand-over destination candidate, and a third cell which is in a nearby area but is not detected.

34 Claims, 8 Drawing Sheets

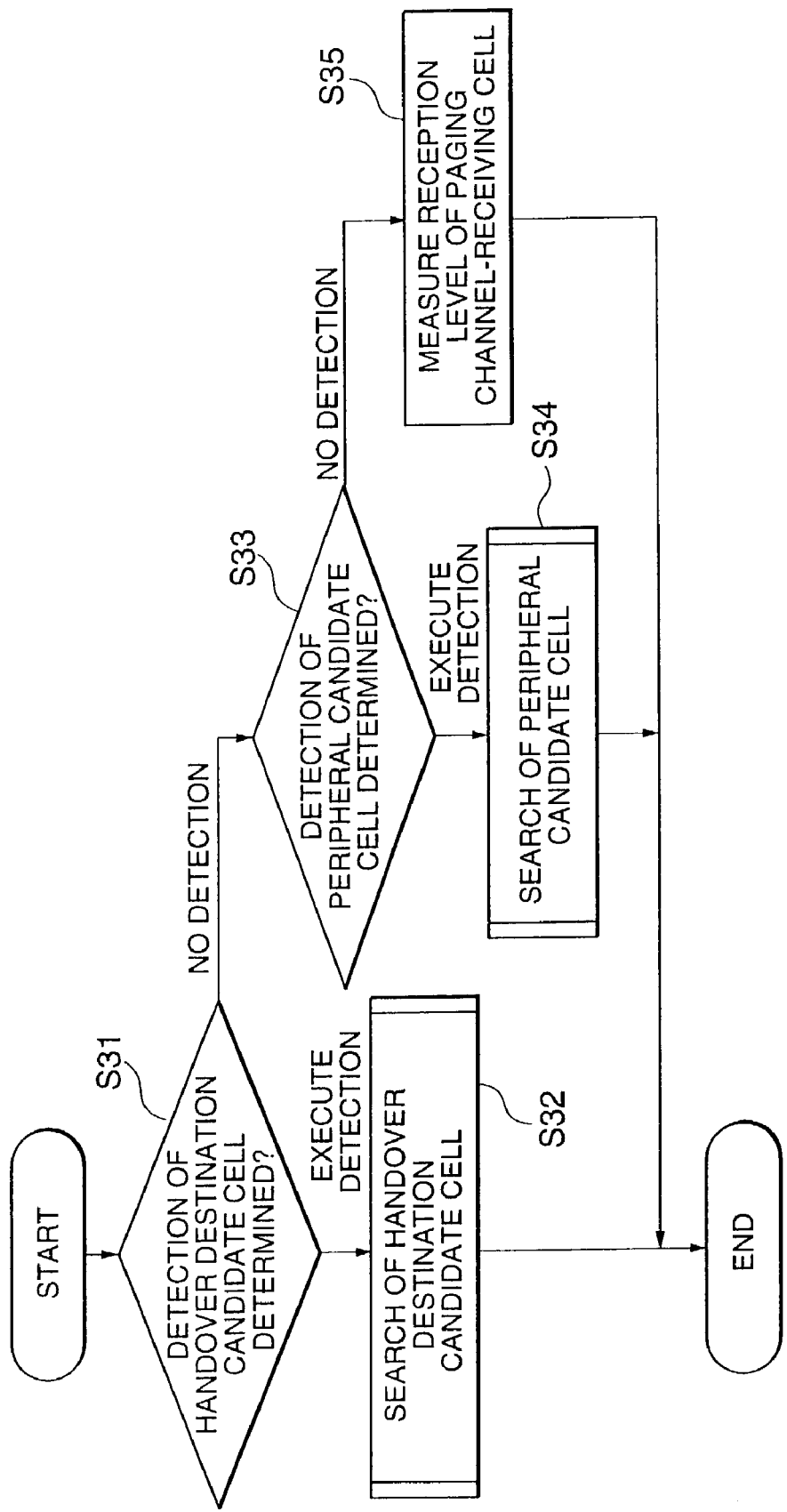

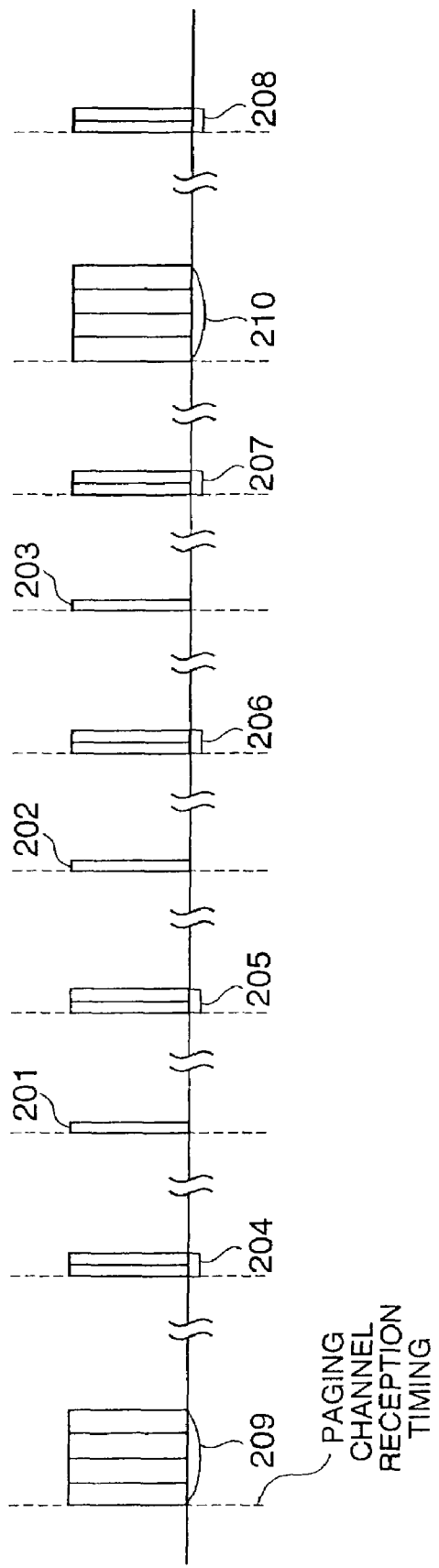

CELLULAR TELEPHONE EQUIPMENT AND CELL SEARCH METHOD USED THEREFOR

BACKGROUND OF THE INVENTION

1. Field of the Invention

The present invention relates to a cellular telephone equipment and a cell search method used therefor and, more particularly, to a cell search method for a CDMA (Code Division Multiple Access) cellular telephone equipment.

2. Description of the Prior Art

CDMA is one of conventional multiple access techniques used when a plurality of mobile stations simultaneously communicate in the same frequency band in a mobile radio communication system (cellular phone system) such as an automobile telephone system or portable telephone system. In CDMA, multiple access is achieved by spread spectrum communication which spreads the spectrum of an information signal to a band much wider than the original information bandwidth and transfers the information signal.

If a mobile station moves from cell to cell in a cellular phone system, CDMA executes, as hand-over, soft hand-over which synthesizes a signal from the base station of the cell the mobile station is leaving and a signal from the base station of the cell it is entering. To execute this hand-over, the mobile station performs cell search; it searches for the base station of the cell it is entering, i.e., cell search of detecting a connection cell.

In CDMA, upon reception of an incoming signal to the mobile station, the base station must notify the mobile station of a message to this effect. The base station broadcasts the incoming signal to all mobile stations in an area in which the mobile station is registered. This procedure is called paging.

In a standby state, the mobile station always monitors a ringing channel (paging channel), and can recognize paging to the mobile station itself. The mobile station compares paging information with information held by it, and if they coincide with each other, sends a response to a base station.

In cell search operation of the CDMA cellular telephone equipment, the cellular telephone equipment in a standby state classifies cells into two types: "cells detected in previous cell search" and "peripheral candidate cells". These cells are searched at once at the paging channel reception timing.

The above-described cell search operation of the conventional cellular telephone equipment searches at once the two types: "cells detected in previous cell search" and "peripheral candidate cells" every paging channel reception timing. The cellular telephone equipment exhibits high search ability, but suffers a long search time and large current consumption.

Even if the search ability is lowered to shorten the search time, the search ability and search time cannot be flexibly adjusted because there is proposed only one search method of classifying cells into two types: "cells detected in previous cell search" and "peripheral candidate cells".

"Cells detected in previous cell search" may be divisionally searched, but the search frequency of a cell which is receiving a paging channel decreases.

SUMMARY OF THE INVENTION

The present invention has been made to overcome the conventional drawbacks, and has as its object to provide a cellular telephone equipment capable of easily adjusting the cell search ability and search time, and divisionally searching even cells that are normally searched at high frequency without decreasing their search frequency.

To achieve the above object, according to the first main aspect of the present invention, there is provided a cellular telephone equipment which performs cell search of detecting a connection cell upon reception of a paging channel transmitted from a base station in order to broadcast an incoming signal, characterized by comprising means for controlling to search each of a plurality of cells to be searched at a reception timing of the paging channel at different frequencies.

In the first main aspect, the plurality of cells to be searched are classified into three types: a first cell which is receiving the paging channel, a second cell as a hand-over destination candidate, and a third cell which is in a nearby area but is not detected.

To achieve the above object, according to the second main aspect of the present invention, there is provided a cell search method for a cellular telephone equipment which performs cell search of detecting a connection cell upon reception of a paging channel transmitted from a base station in order to broadcast an incoming signal, characterized by comprising the step of searching each of a plurality of cells to be searched at a reception timing of the paging channel at different frequencies.

In the second main aspect, the plurality of cells to be searched are classified into three types: a first cell which is receiving the paging channel, a second cell as a hand-over destination candidate, and a third cell which is in a nearby area but is not detected.

When waiting for an incoming signal, the cellular telephone equipment of the present invention classifies cells into three types: a cell which is receiving a paging channel, hand-over destination candidate cells, and cells which are in a nearby area but are not detected. The cellular telephone equipment searches cells at an intermittent paging channel reception timing while changing the frequency for the three classifications. This facilitates adjusting the cell search detection ability and operation time.

More specifically, in the CDMA system of the present invention, when a CDMA cellular telephone equipment (to be referred to as a mobile station hereinafter) exists in a cell A, the mobile station receives a paging channel from the high-field-level cell A in a standby state This mobile station can also receive radio waves from cells B to G adjacent to the cell A. In cell search operation, the mobile station can detect and save the radio frame timings of the cells A to G, and measure the reception level within a short time by using the radio frame timings.

The mobile station can not receive radio waves from a peripheral cell H, and cannot detect the cell H even by search operation. When, however, the mobile station receives the spread code of the cell H as one of adjacent cell candidates, the mobile station must detect the cell H.

To detect an undetected cell, the mobile station must perform radio slot timing identification, radio frame timing identification, and spread code identification because the radio frame timing is unknown, resulting in a long detection time. The mobile station cannot predict which of cells is to be detected, and must search a predetermined number of cells.

In this state, the cells A to H are classified into three types: "a cell which is receiving a paging channel (to be referred to as an active cell hereinafter)" (cell A), "hand-over destination candidate cells (to be referred to as monitor cells hereinafter)" (cells B to G), and "a cell which is in a nearby area but is not detected (to be referred to as an undetected cell hereinafter)" (cell H).

In an active cell, degradation in reception level caused by movement of the mobile station must be immediately sensed to perform hand-over. Thus, the reception level must be measured and monitored on request.

Also in a monitor cell, if the mobile station moves, hand-over must be executed to receive a paging channel. Measurement of the reception level and update of the radio frame timing must be done on request.

An undetected cell need not be immediately detected, but hand-over may have to be done as the mobile station continues to move. The undetected cell must be detected at a given frequency.

In a standby state, the mobile station intermittently receives a paging channel, and searches cells at the paging channel reception timing. The mobile station searches an active cell every reception timing, and measures the reception level. Since a plurality of monitor cells exist, the mobile station searches the cells once in a plurality of paging channel reception timings, and executes measurement of the reception level and update of the radio frame timing. The mobile station searches undetected cells which take a long search time at a lower frequency.

As described above, the present invention classifies cells to be searched into three types, and restricts the number of cells searched at the paging channel reception timing. This allows properly adjusting the search frequencies of active and monitor cells which do not take a long search time and the search frequency of undetected cells which take a long search time. The cell detection ability and detection time can be easily adjusted.

According to the present invention, the cellular telephone equipment which performs cell search of detecting a connection cell upon reception of a paging channel transmitted from a base station in order to broadcast an incoming signal searches at the paging channel reception timing with different frequencies a plurality of cells to be searched which are classified into three types in advance. The cell search ability and search time can be easily adjusted, and even cells that are normally searched at high frequency can be divisionally searched without decreasing the frequency.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 7 is a flow chart showing the operation of a mobile station according to another embodiment of the present invention; and FIG. 8 is a timing chart showing cell search operation of the mobile station according to another embodiment of the present invention.

DETAILED DESCRIPTION OF THE PREFERRED EMBODIMENTS

Several preferred embodiments of the present invention will be described below with reference to the accompanying drawings.

Figure 1:
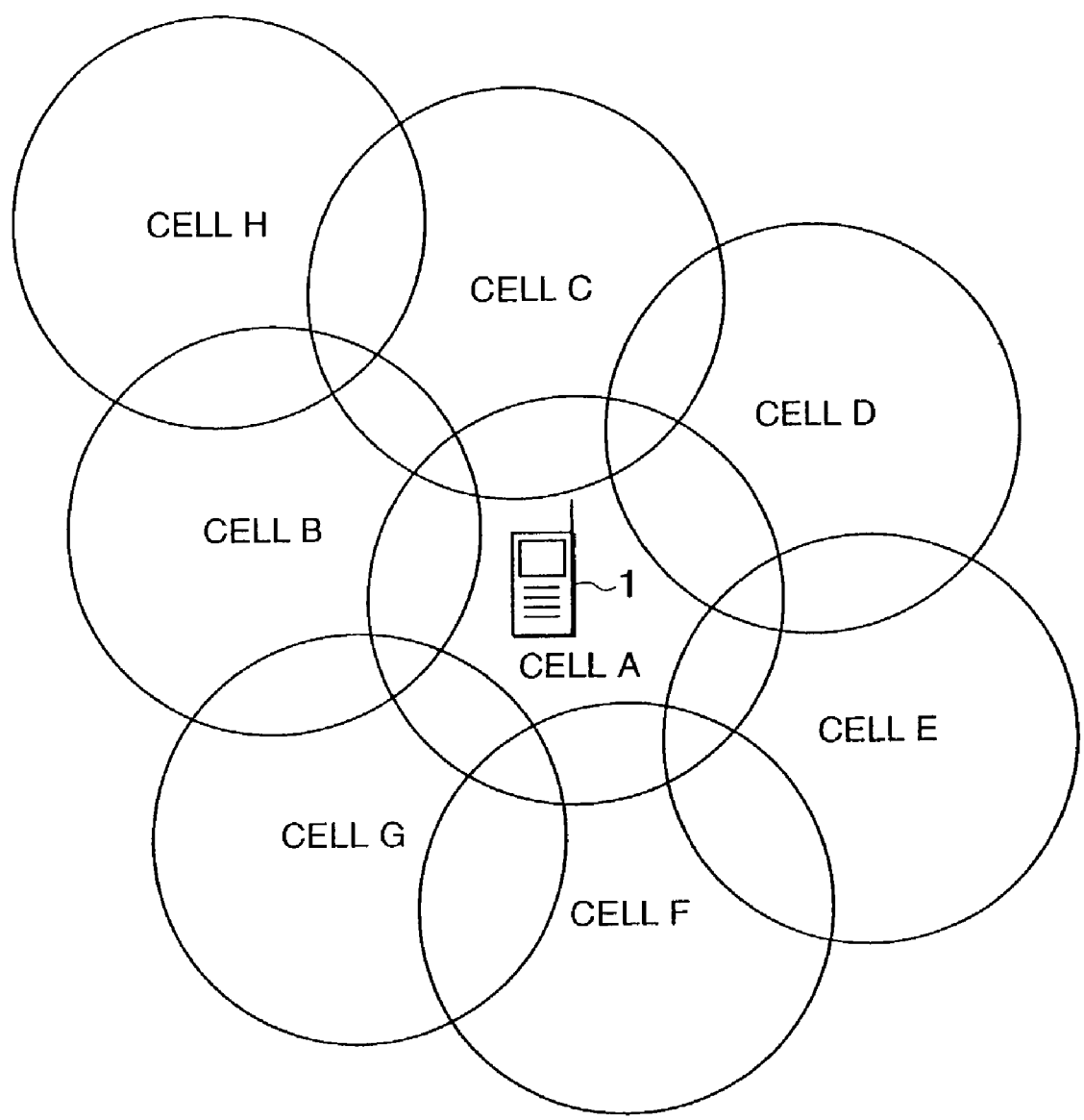
FIG. 1 is a view showing the configuration of a CDMA system for explaining an embodiment of the present invention.

FIG. 1 is a view showing a system configuration for explaining an embodiment of the present invention. In FIG. 1, a CDMA cellular telephone equipment (to be referred to as a mobile station hereinafter) 1 exists in a cell A, and receives the paging channel of a high-field-level cell A in a standby state. The paging channel is used to broadcast an incoming signal from a base station (not shown) to all mobile stations in the cell A.

The mobile station 1 can also receive radio waves from (hand-over destination) cells B to G adjacent to the cell A. In cell search operation, the mobile station 1 can detect and save the radio frame timings of the cells A to G, and measure the reception level within a short time by using the radio frame timings.

The mobile station 1 cannot receive radio waves from a peripheral cell H, and cannot detect the cell H even by search operation. When, however, the mobile station 1 receives the spread code of the cell H as one of adjacent cell candidates, the mobile station 1 must detect the cell H.

To detect an undetected cell, the mobile station 1 must perform radio slot timing identification, radio frame timing identification, and spread code identification because the radio frame timing is unknown, resulting in a long detection time. The mobile station 1 cannot predict which of cells is to be detected, and must search a predetermined number of cells.

In this state, the cells A to H are classified into three types: "a cell which is receiving a paging channel (to be referred to as an active cell hereinafter)" (cell A), "hand-over destination candidate cells (to be referred to as monitor cells hereinafter)" (cells B to G), and "a cell which is in a nearby area -but is not detected (to be referred to as an undetected cell hereinafter)" (cell H).

In an active cell, degradation in reception level caused by movement of the mobile station 1 must be immediately sensed to perform hand-over. Thus, the reception level must be measured and monitored on request.

Also in a monitor cell, if the mobile station 1 moves, hand-over must be executed to receive a paging channel. Measurement of the reception level and update of the radio frame timing must be done on request.

An undetected cell need not be immediately detected, but hand-over may have to be done as the mobile station 1 moves. The undetected cell must be detected at a given frequency.

In a standby state, the mobile station 1 intermittently receives a paging channel, and searches cells at the paging channel reception timing. The mobile station 1 searches an active cell every reception timing, and measures the reception level.

Since a plurality of monitor cells exist, the mobile station 1 searches the cells once in a plurality of paging channel reception timings, and executes measurement of the reception level and update of the radio frame timing. The mobile station 1 searches undetected cells which take a long search time at a lower frequency.

In this manner, the present invention classifies cells to be searched into three types: "active cell", "monitor cells", and "undetected cells", and restricts the number of cells searched by the mobile station 1 at the paging channel reception timing. This enables adjusting the search frequencies of active and monitor cells which do not take a long search time and the search frequency of undetected cells which take a long search time. The cell detection ability and detection time can be easily adjusted.

Figure 2:
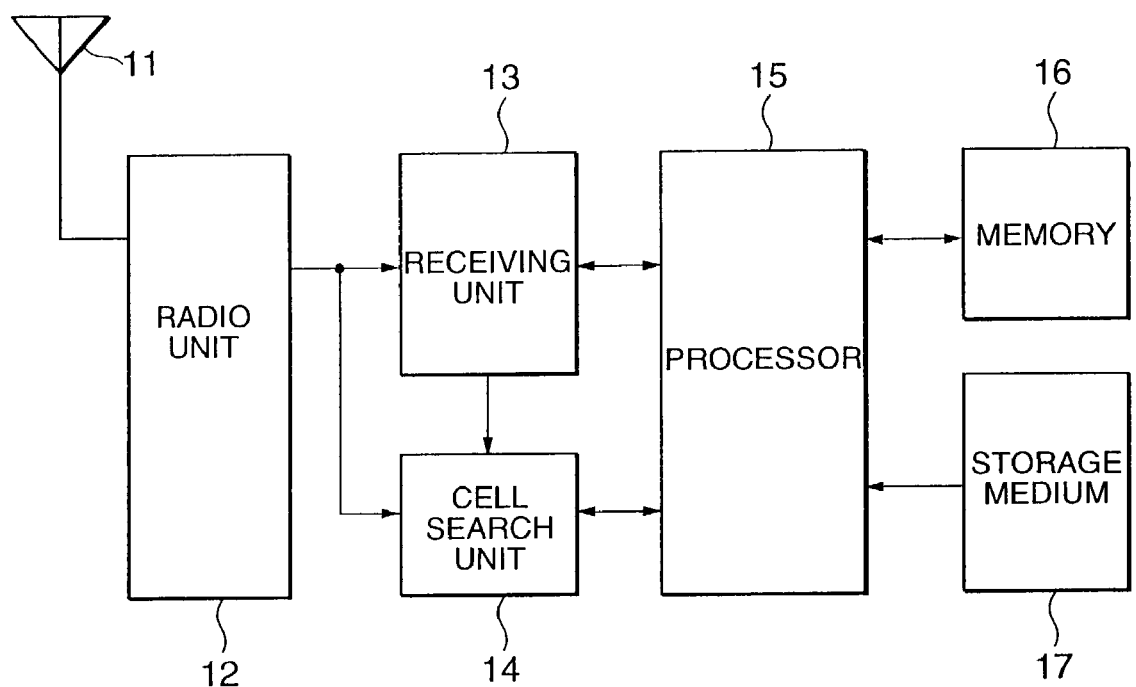
FIG. 2 is a block diagram showing the arrangement of a mobile station according to the embodiment of the present invention.

FIG. 2 is a block diagram showing the arrangement of the mobile station 1 according to the embodiment of the present invention. In FIG. 2, the mobile station 1 operates under the control of a program. The mobile station 1 is constituted by an antenna 11, radio unit 12, receiving unit 13, cell search unit 14, processor 15, memory 16, and storage medium 17.

The radio unit 12 modulates/demodulates radio signals transmitted/received via the antenna 11. The receiving unit 13 performs orthogonal code despread, power measurement, radio frame coupling, and error correction decoding for received data demodulated by the radio unit 12. The receiving unit 13 also generates a radio frame timing and supplies it to the cell search unit 14.

The cell search unit 14 performs orthogonal code despread for a common pilot channel demodulated by the radio unit 12, and executes power measurement. The cell search unit 14 further detects the radio slot timing, radio frame timing, and spread code of each cell on the basis of the power measurement result.

The processor 15 extracts a program from the storage medium 17, and executes the program. The memory 16 stores information from the processor 15. The storage medium 17 stores a program to be executed by the processor 15.

Figure 3:
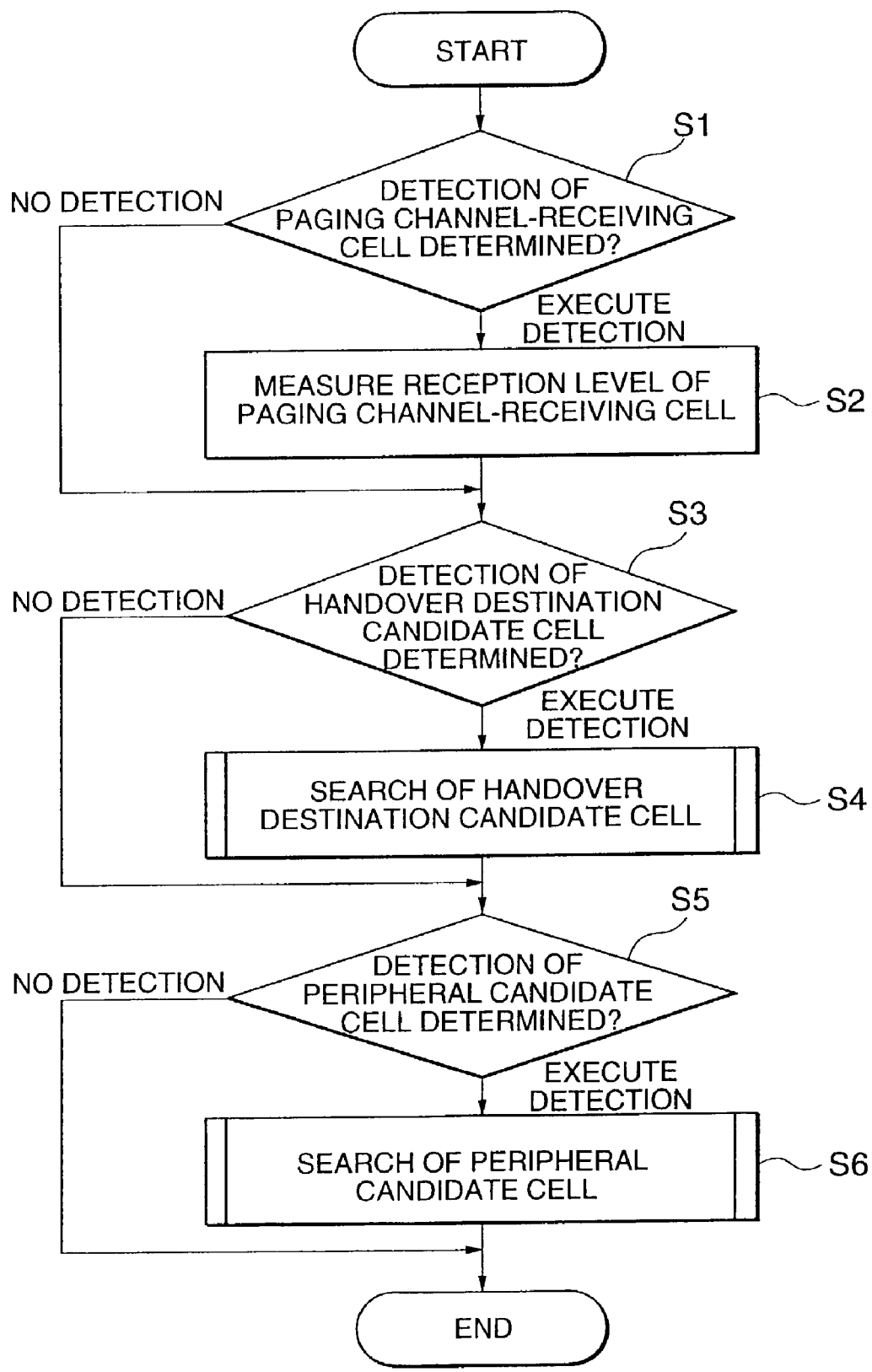
FIG. 3 is a flow chart showing the operation of the mobile station according to the embodiment of the present invention.
Figure 4:
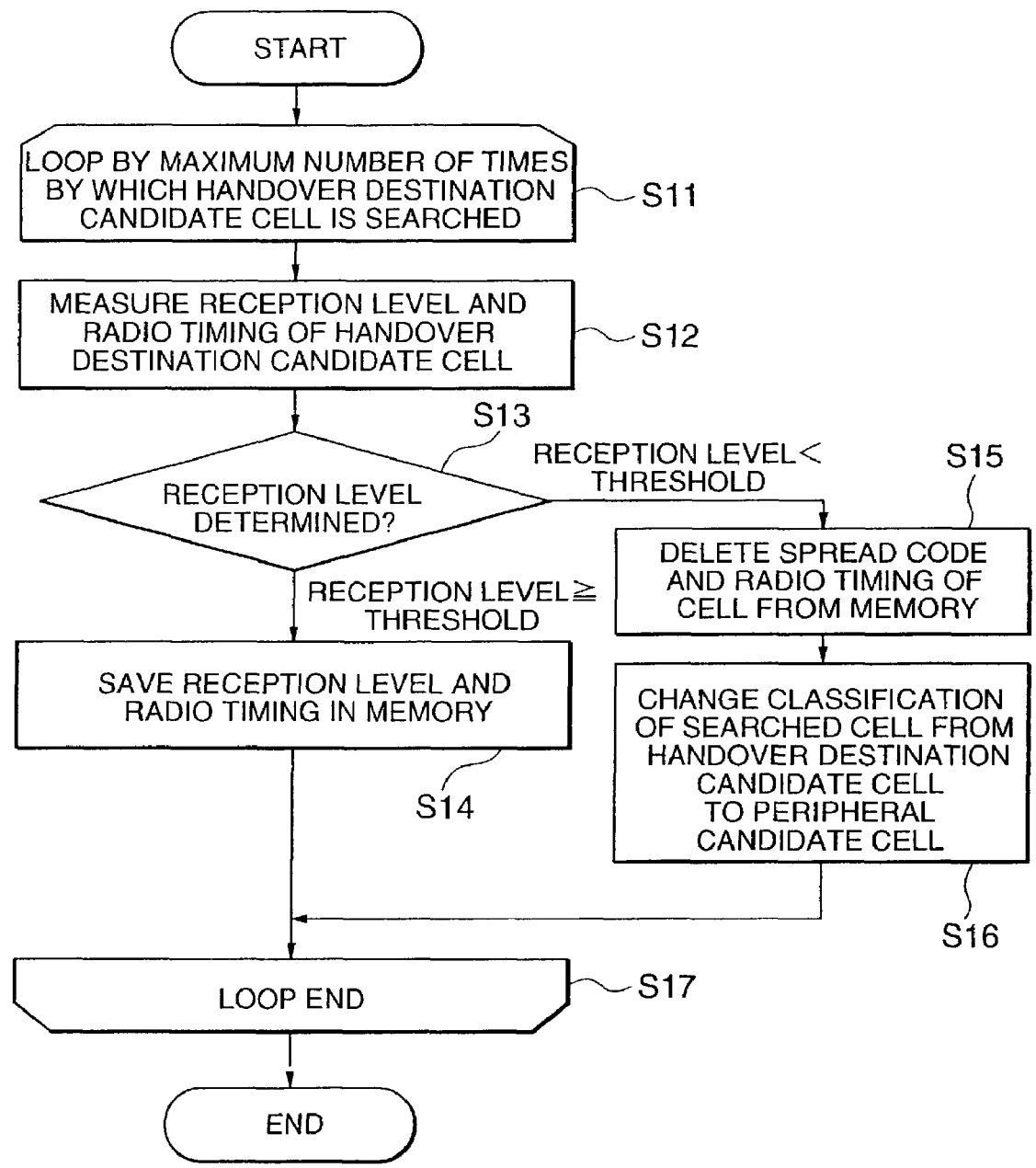
FIG. 4 is a flow chart showing the operation of the mobile station according to the embodiment of the present invention.
Figure 5:
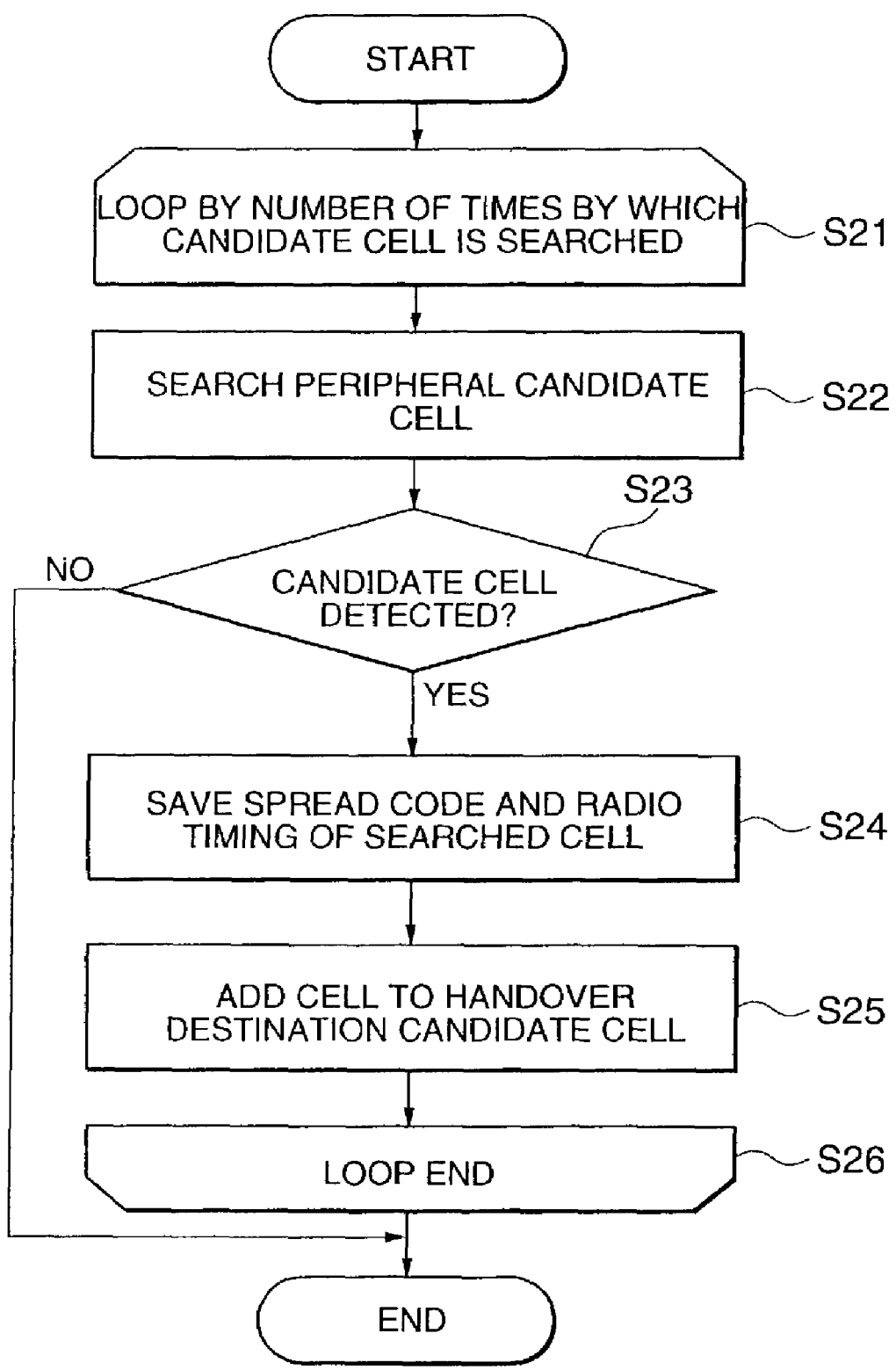
FIG. 5 is a flow chart showing the operation of the mobile station according to the embodiment of the present invention.

FIGS. 3 to 5 are flow charts showing the operation of the mobile station 1 according to the embodiment of the present invention. The operation of the mobile station 1 according to the embodiment of the present invention will be explained with reference to FIGS. 3 to 5.

When the mobile station 1 is waiting for an incoming signal, the processor 15 performs operations shown in FIGS. 3 to 5 at a paging channel reception timing. In this case, the processor 15 loads a program from the storage medium 17 and executes the program to execute processing shown in FIGS. 3 to 5.

The mobile station 1 checks whether to search an active cell which is receiving a paging channel (step S1 in FIG. 3). At an active cell search timing, the mobile station 1 shifts to measurement of the reception level, and measures the reception level (step S2 in FIG. 3). In this case, the mobile station 1 stores the reception level measured by the cell search unit 14 in the memory 16, and updates the reception level of the active cell.

At a timing at which an active cell is not searched, the mobile station 1 shifts to step S3, and checks whether to search a monitor cell as a hand-over destination candidate cell (step S3 in FIG. 3). At a monitor cell search timing, the mobile station 1 searches a monitor cell (step S4 in FIG. 3).

At a timing at which a monitor cell is not searched, the mobile station 1 shifts to step S5, and checks whether to search an undetected cell as a peripheral candidate cell (step S5 in FIG. 3).

At an undetected cell search timing, the mobile station 1 searches an undetected cell (step S6 in FIG. 3), and ends cell search operation. At a timing at which an undetected cell is not searched, the mobile station 1 directly ends cell search operation.

In monitor cell search, referring to FIG. 4, the mobile station 1 loops through a loop from steps S11 to S17 the maximum number of times by which a monitor cell is searched at the paging channel reception timing (step S11 in FIG. 4).

The mobile station 1 measures the reception timing and radio timing of a cell to be searched (step S12 in FIG. 4) The mobile station 1 compares the measured reception level with the reception level threshold of a hand-over destination candidate cell (step S13 in FIG. 4). If the measured reception level is equal to or higher than the threshold, the mobile station 1 stores the measured reception level and radio timing in the memory 16, and updates the reception level and radio timing of the searched cell (step S14 in FIG. 4) After that, the mobile station 1 switches the cell to be searched, and advances to the next loop (step S17 in FIG. 4).

If the measured reception level is lower than the threshold, the mobile station 1 erases the spread code, reception level, and radio timing of a searched cell that are stored in the memory 16 (step S15 in FIG. 4). The mobile station 1 changes the type of cell to be searched from a monitor cell to an undetected cell (step S16 in FIG. 4), and shifts to step s17.

In undetected cell search, referring to FIG. 5, the mobile station 1 loops through a loop from steps S21 to S26 the number of times by which an undetected cell is searched at the paging channel reception timing (step S21 in FIG. 5).

The mobile station 1 searches an undetected cell (step S22 in FIG. 5). The mobile station 1 checks the search result (step S23 in FIG. 5) , and if a peripheral cell as an adjacent cell candidate is detected, stores the spread code, reception level, and radio timing of the searched cell in the memory 16 (step S24 in FIG. 5). The mobile station 1 adds the searched cell to monitor cells (step S25 in FIG. 5), and repeats the processing loop (step S26 in FIG. 5).

If the mobile station 1 cannot detect any cell, the mobile station 1 shifts to step S26, and repeats the processing loop.

The operation of the mobile station 1 according to the embodiment of the present invention will be exemplified. In FIG. 1, the mobile station 1 in the cell A can receive radio waves from the cells B to G adjacent to the cell A. The mobile station 1 has already detected the cells A to G by cell search operation and has stored the spread codes and radio timings of the cells in the memory 16. The mobile station 1 cannot receive radio waves from the cell H.

In the mobile station 1 which is waiting for an incoming signal, the processor 15 performs cell search operation at the paging channel reception timing. In this embodiment, three search frequencies for eight cells, i.e., an active cell (cell A) as a cell which is receiving a paging channel, monitor cells (cells B to G) as hand-over destination candidate cells, and an undetected cell (cell H) as a peripheral candidate cell are adjusted such that the active cell is searched every paging channel reception timing; the monitor cells, once in two paging channel reception timings; and the undetected cell, once in eight paging channel reception timings. The maximum number of monitor cells searched at the paging channel reception timing is set to 2, and the number of undetected cell search operations is set to 4.

At the paging channel reception timing, the processor 15 performs processing operations shown in FIGS. 3 to 5. More specifically, the mobile station 1 checks whether to search an active cell (step S1 in FIG. 3).

In this embodiment, an active cell is detected every paging channel reception timing. Thus, the mobile station 1 shifts to measurement of the reception level, and measures the reception level (step S2 in FIG. 3). The mobile station 1 stores the measured reception level measured in the memory 16, and updates the reception level of the active cell.

The mobile station 1 checks whether to search a monitor cell (step S3 in FIG. 3). In this embodiment, a monitor cell is detected once in two paging channel reception timings. The mobile station 1 searches a monitor cell every other paging channel reception timing (step S4 in FIG. 3). At a timing at which a monitor cell is not searched, the mobile station 1 shifts to step S5.

Then, the mobile station 1 checks whether to search an undetected cell (step S5 in FIG. 3). In this embodiment, an undetected cell is detected once in eight paging channel reception timings. The mobile station 1 searches an undetected cell every eight paging channel reception timings (step S6 in FIG. 3). At a timing at which an undetected cell is not searched, the mobile station 1 ends cell search operation.

In monitor cell search, referring to FIG. 4, the mobile station 1 loops through the loop from steps S11 to S17 the maximum number of times by which a monitor cell is searched at the paging channel reception timing.

In this embodiment, the maximum number of monitor cells searched at the paging channel reception timing is 2. The mobile station 1 loops through the loop from steps S11 to S17 twice. Six monitor cells exist in this embodiment and must be searched in three groups.

Since the mobile station 1 detects monitor cells once in two paging channel reception timings, completion of searching six cells requires a time corresponding to six paging channel reception timings.

In undetected cell search operation, referring to FIG. 5, the mobile station 1 loops through the loop from steps S21 to S26 the number of times by which an undetected cell is searched at the paging channel reception timing.

The number of undetected cell search operations is 4 in this embodiment, and the mobile station 1 loops through the loop from steps S21 to S26 four times. The minimum and maximum numbers of cells searchable at this timing are 0 and 4, respectively.

Figure 6:
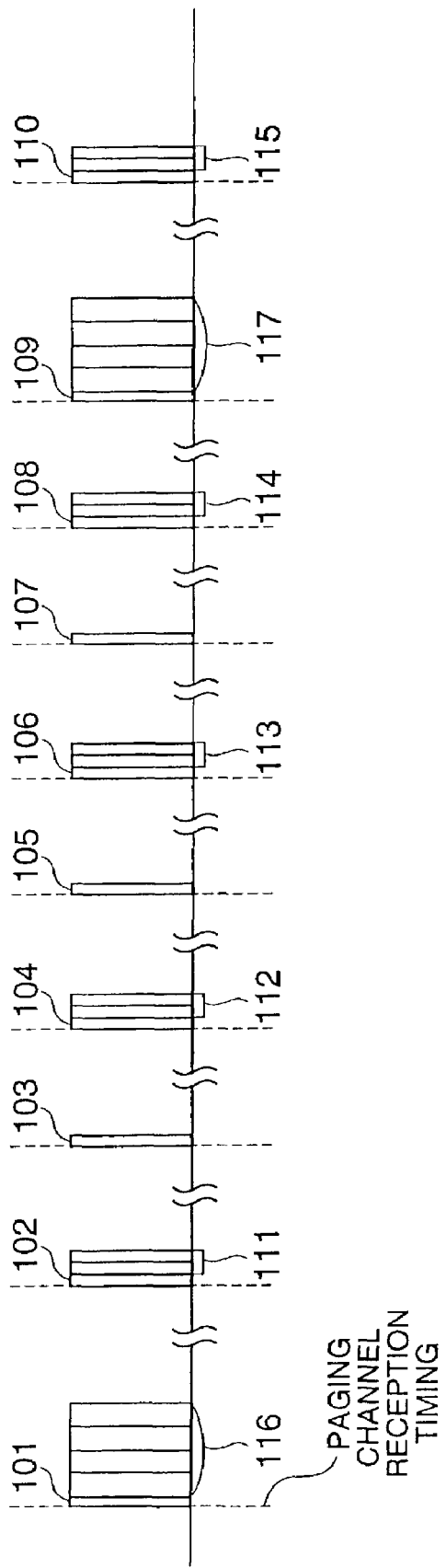
FIG. 6 is a timing chart showing cell search operation of the mobile station according to the embodiment of the present invention.

FIG. 6 is a timing chart showing cell search operation of the mobile station 1 according to the embodiment of the present invention. The overall cell search operation of the mobile station 1 according to the embodiment of the present invention will be described with reference to FIG. 6.

In FIG. 6, search operations 101 to 110 are active cell search. In active cell search, the reception level is measured every paging channel reception timing.

Search operations 111 to 115 are monitor cell search. In monitor cell search, the reception level and radio timing are measured once in two paging channel reception timings.

Search operations 116 and 117 are undetected cell search. In undetected cell search, a cell is searched once in eight paging channel reception timings.

In this way, the cells A to H are classified into an active cell (cell A) as "a cell which is receiving a paging channel", monitor cells (cells B to G) as "hand-over destination candidate cells", and an undetected cell (cell H) as "a peripheral candidate cell". By determining the search frequency of each type of cell, the search ability and search time can be flexibly adjusted. The cell search ability and search time can be easily adjusted at the paging channel reception timing.

The cells A to H can be classified in the above manner to adjust the search frequency for each classification. A cell which must be searched at a high frequency can be adjusted to be searched more often. Even cells that are normally searched at high frequency such as cells which are receiving paging channels can be divisionally searched without decreasing the frequency.

FIG. 7 is a flow chart showing the operation of a mobile station according to another embodiment of the present invention. The arrangement of the mobile station according to this embodiment of the present invention is the same as that of the mobile station 1 according to the embodiment of the present invention shown in FIG. 2, the system configuration according to this embodiment of the present invention is the same as that according to the embodiment of the present invention shown in FIG. 1, and a description thereof will be omitted.

In the above-described embodiment of the present invention, as shown in FIG. 3, search start determination processes for an active cell (cell A) as "a cell which is receiving a paging channel", monitor cells (cells B to G) as "hand-over destination candidate cells", and an undetected cell (cell H) as "a peripheral cell" are simultaneously executed at the paging channel reception timing. Thus, three types of cells may be simultaneously detected. In order to shorten the cell search time per paging channel reception timing, three types of cells may be exclusively detected. This embodiment of the present invention exclusively detects three types of cells.

The whole operation in the embodiment of the present invention will be explained with reference to FIGS. 1, 2, 4, 5 and 7.

In a mobile station 1 which is waiting for an incoming signal, a processor 15 performs processing operations shown in FIGS. 4, 5, and 7 at a paging channel reception timing.

The mobile station 1 checks whether to search a monitor cell as "a hand-over destination candidate cell" (step S31 in FIG. 7). At a monitor cell search timing, the mobile station 1 searches a monitor cell (step S32 in FIG. 7), and ends cell search operation.

At a timing at which a monitor cell is not searched, the mobile station 1 shifts to step S33, and checks whether to search an undetected cell as "a peripheral candidate cell" (step S33 in FIG. 7). At an undetected cell search timing, the mobile station 1 searches an undetected cell (step S34 in FIG. 7), and ends cell search operation.

At a timing at which an undetected cell is not searched, the mobile station 1 shifts to step S35, searches an active cell as "a cell which is receiving a paging channel", and ends cell search operation. In this case, the mobile station 1 shifts to measurement of the reception level, and measures the reception level (step S35 in FIG. 7).

Referring to FIG. 4, monitor cell search is the same as the processing operation according to the above embodiment of the present invention. Referring to FIG. 5, undetected cell search is the same as the processing operation according to the above embodiment of the present invention.

The operation of the mobile station 1 according to another embodiment of the present invention will be exemplified. In FIG. 1, the mobile station 1 in the cell A can receive radio waves from the cells B to G adjacent to the cell A. The mobile station 1 has already detected the cells A to G by cell search operation and has stored the spread codes and radio timings of the cells in the memory 16. The mobile station 1 cannot receive radio waves from the cell H.

In the mobile station 1 which is waiting for an incoming signal, the processor 15 performs cell search operation at the paging channel reception timing. In this embodiment, three search frequencies for an active cell (cell A), monitor cells (cells B to G), and an undetected cell (cell H) are adjusted such that the monitor cells are searched once in two paging channel reception timings, the undetected cell is searched once in eight paging channel reception timings, and the active cell is searched when these two types of cells are not searched.

If the monitor cell search timing and undetected cell search timing coincide with each other, priority is given to monitor cell search. The maximum number of monitor cells searched at the paging channel reception timing is set to 2, and the number of undetected cell search operations is set to 4.

At the paging channel reception timing, the processor 15 performs processing operations shown in FIGS. 4, 5, and 7. More specifically, the mobile station 1 checks whether to search a monitor cell (step S31 in FIG. 7). In this embodiment, a monitor cell is detected once in two paging channel reception timings. The mobile station 1 searches a monitor cell every other paging channel reception timing (step S32 in FIG. 7), and ends cell search operation.

At a timing at which a monitor cell is not searched, the mobile station 1 shifts to step S33, and checks whether to search an undetected cell (step S33 in FIG. 5). In this embodiment, an undetected cell is detected once in eight paging channel reception timings. The mobile station 1 searches an undetected cell every eight paging channel reception timings (step S34 in FIG. 7), and ends cell search operation.

At a timing at which an undetected cell is not searched, the mobile station 1 searches an active cell (step S35 in FIG. 7).

In monitor cell search, referring to FIG. 4, the mobile station 1 loops through a loop from steps S11 to S17 the maximum number of times by which a monitor cell is searched at the paging channel reception timing.

In this embodiment, the maximum number of monitor cells searched is 2. The mobile station 1 loops through the loop from steps S11 to S17 twice. Six monitor cells exist in this embodiment and must be searched in three groups.

Since the mobile station 1 detects monitor cells once in two paging channel reception timings, completion of searching six cells requires a time corresponding to six paging channel reception timings.

In undetected cell search operation, referring to FIG. 5, the mobile station 1 loops through a loop from steps S21 to S26 the number of times by which an undetected cell is searched at the paging channel reception timing. The number of undetected cell search operations is 4 in this embodiment, and the mobile station 1 loops through the loop from steps S21 to S26 four times.

FIG. 8 is a timing chart showing cell search operation of the mobile station 1 according to another embodiment of the present invention. The entire cell search operation of the mobile station 1 according to another embodiment of the present invention will be described with reference to FIG. 8.

In FIG. 8, search operations 201 to 203 are active cell search. In active cell search, the reception level is measured at paging channel reception timing when a monitor cell and undetected cell are not searched.

Search operations 204 to 208 are monitor cell search. In monitor cell search, the reception level and radio timing are measured once in two paging channel reception timings.

Search operations 209 and 210 are undetected cell search. In undetected cell search, undetected cells are searched once in eight paging channel reception timings.

What is claimed is:

1. A cellular telephone equipment which performs cell search of detecting a connection cell upon reception of a paging channel transmitted from a base station in order to broadcast an incoming signal, comprising means for controlling to search each of a plurality of cells to be searched at a reception timing of the paging channel at different frequencies, the different frequencies being assigned based on a categorization of each of the plurality of cells.

2. An equipment according to claim 1, characterized in that the plurality of cells to be searched are classified into three types: a first cell which is receiving the paging channel, a second cell as a hand-over destination candidate, and a third cell which is in a nearby area but is not detected.

3. An equipment according to claim 2, characterized in that search frequencies for the first to third cells are individually set.

4. An equipment according to claim 2, characterized in that search frequencies for the cells to be searched that are classified into the three types are adjusted to the first cell, the second cell, and the third cell.

5. An equipment according to claim 2, characterized in that the first cell is searched every paging channel reception timing.

6. An equipment according to claim 3, characterized in that the first cell is searched every paging channel reception timing.

7. An equipment according to claim 4, characterized in that the first cell is searched every paging channel reception timing.

8. An equipment according to claim 2, characterized in that the first cell is searched when the second and third cells are not searched.

9. An equipment according to claim 3, characterized in that the first cell is searched when the second and third cells are not searched.

10. An equipment according to claim 4, characterized in that the first cell is searched when the second and third cells are not searched.

11. A cell search method for a cellular telephone equipment which performs cell search of detecting a connection cell upon reception of a paging channel transmitted from a base station in order to broadcast an incoming signal, comprising the step of searching each of a plurality of cells to be searched at a reception timing of the paging channel at different frequencies, the different frequencies being assigned based on a categorization of each of the plurality of cells.

12. A method according to claim 11, characterized in that the plurality of cells to be searched are classified into three types: a first cell which is receiving the paging channel, a second cell as a hand-over destination candidate, and a third cell which is in a nearby area but is not detected.

13. A method according to claim 12, characterized in that search frequencies for the first to third cells are individually set.

14. A method according to claim 12, characterized in that search frequencies for the cells to be searched that are classified into the three types are adjusted to the first cell, the second cell, and the third cell.

15. A method according to claim 12, characterized in that the first cell is searched every paging channel reception timing.

16. A method according to claim 13, characterized in that the first cell is searched every paging channel reception timing.

17. A method according to claim 14, characterized in that the first cell is searched every paging channel reception timing.

18. A method according to claim 12, characterized in that the first cell is searched when the second and third cells are not searched.

19. A method according to claim 13, characterized in that the first cell is searched when the second and third cells are not searched.

20. A method according to claim 14, characterized in that the first cell is searched when the second and third cells are not searched.

21. An equipment according to claim 2, wherein the first cell is searched every reception timing, and the second cell is searched once in a plurality of paging channel reception timings.

22. An equipment according to claim 5, wherein the second cell is searched once in a plurality of paging channel reception timings.

23. An equipment according to claim 6, wherein the second cell is searched once in a plurality of paging channel reception timings.

24. An equipment according to claim 7, wherein the second cell is searched once in a plurality of paging channel reception timings.

25. An equipment according to claim 8, wherein the first cell is searched every reception timing.

26. An equipment according to claim 9, wherein the first cell is searched every reception timing.

27. An equipment according to claim 10, wherein the first cell is searched every reception timing.

28. A method according to claim 12, further comprising the step of searching the first cell every reception timing, and searching the second cell once in a plurality of paging channel reception timings.

29. A method according to claim 15, wherein the second cell is searched once in a plurality of paging channel reception timings.

30. A method according to claim 16, wherein the second cell is searched once in a plurality of paging channel reception timings.

31. A method according to claim 17, wherein the second cell is searched once in a plurality of paging channel reception timings.

32. A method according to claim 18, wherein the first cell is searched every reception timing.

33. A method according to claim 19, wherein the first cell is searched every reception timing.

34. A method according to claim 20, wherein the first cell is searched every reception timing.

* * * * *